United States Patent [19]
Elliott et al.

[11] Patent Number: 5,477,402
[45] Date of Patent: Dec. 19, 1995

[54] DISK FILE WITH MULTIPLEXED SERVO SYSTEM

[75] Inventors: Peter J. Elliott, Alresford; Anthony R. Hearn, Winchester, both of United Kingdom

[73] Assignee: International Business Machines Corporation, Armonk, N.Y.

[21] Appl. No.: 212,374

[22] Filed: Mar. 10, 1994

Related U.S. Application Data

[63] Continuation of Ser. No. 880,427, May 8, 1992, abandoned.

[51] Int. Cl.$^6$ .................................................. G11B 5/596
[52] U.S. Cl. .................... 360/77.08; 360/77.06; 360/77.05; 360/75; 369/43
[58] Field of Search ..................... 369/44.11, 43, 369/44.28; 360/77.01, 77.02, 77.04, 77.05, 77.06, 77.07, 77.08, 75, 77.11, 98.01

[56] References Cited

U.S. PATENT DOCUMENTS

| | | | |
|---|---|---|---|
| 4,075,667 | 2/1978 | Rose et al. | 360/77 |
| 4,896,228 | 1/1990 | Amakasu et al. | 360/77.05 |
| 5,099,367 | 3/1992 | Sidman | 360/77.05 |
| 5,117,408 | 5/1992 | Weispfenning et al. | 360/77.05 |

FOREIGN PATENT DOCUMENTS

| | | |
|---|---|---|
| 0021392 | 8/1982 | European Pat. Off. . |
| 0100841 | 9/1987 | European Pat. Off. . |
| 0267771 | 11/1987 | European Pat. Off. . |
| 0353767 | 2/1990 | European Pat. Off. . |
| 2191877 | 6/1987 | United Kingdom . |

OTHER PUBLICATIONS

IBM Technical Disclosiure Bulletin vol. 28 No. 8 Jan. 1986 p. 300 "Disc File Controlled by Multiplexed Servo Samples".

*Primary Examiner*—Georgia Y. Epps
*Assistant Examiner*—Muhammad N. Edun
*Attorney, Agent, or Firm*—Richard E. Billion; Roy W. Truelson

[57] ABSTRACT

A disk file includes multiple disk surfaces, on which servo information is recorded, with an offset in azimuth from one disk surface to another. Each head comprises a magnetoresistive stripe for reading and an inductive write coil. The servo system reads servo information from each disk in turn, multiplexing the signals from each disk together to form a single position error signal (PES). The separation of the servo multiplexer, attached to the MR stripes, from the write multiplexer, attached to the inductive coils, avoids problems due to contamination of the servo signal by the write signal. A least squares fit is used to generate the PES from the series of servo samples from each disk surface.

14 Claims, 3 Drawing Sheets

DISK FILE WITH MULTIPLEXED SERVO SYSTEM

This application is a continuation of application Ser. No. 07/880,427, filed May 8, 1992, now abandoned.

FIELD OF THE INVENTION

This invention relates to disk files, and more particularly to disk files with magnetoresistive heads and a multiplexed servo system for controlling the positions thereof.

BACKGROUND OF THE INVENTION

Modern disk files usually comprise one or more magnetic data storage disks mounted for rotation about a common axis. Data is stored on the disks in concentric tracks, and is read from or written to the disk surfaces by transducing heads. There is generally one read/write, or data, head per disk surface, although only a single head/disk surface combination is actually used to read or write user data at any given time. Typically a write signal is supplied to a multiplexer, which then passes the signal onto whichever head is currently selected for writing. Likewise, a read signal is obtained from a chosen head via a separate, read multiplexer. All the heads are ganged together for common motion on an actuator, which moves the heads radially in and out across their respective disk surfaces. Movement of the actuator itself is controlled by a servo system, utilizing servo information recorded on one or more of the disks. By reading this servo information, the actual positions of the heads can be determined, and after comparison with the desired head positions, control signals can be sent to move the actuator accordingly.

Heads for disk files conventionally comprise inductive read/write coils, but another known form of head uses the magnetoresistive (MR) effect to read data from the disk surface, this generally providing a stronger read signal, especially for low velocity media. Since the MR effect cannot be used for writing data, an MR head typically comprises an MR stripe made of a material such as Permalloy for reading data, located between the pole tips of a conventional inductive write coil (thin film or otherwise). Examples of MR heads are described in EPB 0021392 and EPB 0100841.

Two types of servo system are commonly used to control the head positions. In the first, a dedicated servo system, one whole disk surface (a servo disk) is used exclusively to store servo information on. A servo head constantly reads this information to provide a continuous signal indicating the position of the servo head with respect to the servo disk, and by extension, the location of all the other data heads on that actuator. The use of a dedicated servo however has two main disadvantages. Firstly, offsets can occur between the servo head and the data heads, for example due to actuator or disk spindle tilt caused by thermal expansion effects. Secondly, there is a reduction in the data storage capacity of the device because a whole disk surface which could potentially store user data instead contains only servo information. EPA 0267771 discloses a disk drive with one servo disk at the top of the disk stack and one at the bottom, wherein problems of spindle tilt are compensated for by linear interpolation between the two servo heads. This improves the track following performance, but at the cost of doubling the servo overhead.

In the second type of servo system, sectors of servo information are interspersed with sectors of data on each disk surface (this type of system is known as a sector servo). As a head follows the data track around, it regularly reads a fresh sample of servo information from each servo sector to control its position with. A sector servo system therefore has no problem with offsets, because the servo signal is obtained from whichever head is actually reading or writing data. Potentially at least, this allows more accurate track following than with a dedicated servo system, in turn permitting higher storage densities.

The servo overhead in a sector servo system, which is distributed between all the disks, may be quite large. This is firstly because it is difficult to greatly reduce the size of individual servo sectors, since each must contain the necessary positional information, preceded by a guard region to protect against accidental overwriting. Secondly, in order to improve track following and to reduce access times, it is desirable to have a high sampling frequency of servo information, which means as many servo sectors as possible. However, increasing the number of servo sectors reduces the amount of disk surface available to store user data on. Thus a sector servo system suffers from an undesirable trade-off between high storage capacity and low access times.

GB 2191877 discloses magnetic disk apparatus that instead of just utilizing servo sectors on the disk surface that is being read from, multiplexes sector servo samples from all the disk surfaces. The servo sector patterns are offset in phase from one disk surface to another, so that as the disks rotate, a servo sector from one disk surface is read, then from another, and so on, until a servo sector from each disk surface has been read, whereupon the sequence repeats. The same basic idea is also disclosed in "Disk file controlled by Multiplexed Servo Samples", I Jones, IBM Technical Disclosure Bulletin 28/8 p. 300, January 1986. Multiplexing servo samples from different disk surfaces produces a higher servo sampling rate without any increase in the number of servo sectors per disk—i.e., without increasing the servo overhead.

The apparatus disclosed in GB 2191877 is read-only, whereas usually the storage capacity of disk files is determined by how accurately the heads can follow the desired track when writing, thereby avoiding any accidental erasure of neighboring tracks. The prior art does not suggest a disk file which is capable of providing a multiplexed sector servo signal during data write operations.

SUMMARY OF THE INVENTION

Accordingly, the invention provides a disk file including:

a plurality of disk data storage surfaces, rotatable in unison, each surface having a pattern of servo information recorded thereon, said patterns of servo information being azimuthally offset from one disk surface to another;

an actuator supporting a plurality of heads, one head being provided for each respective disk surface, each of said heads including an inductive coil for writing information onto the disk surface, and means adapted to read information therefrom using the magnetoresistive effect;

and a head position control system comprising: means for selecting each head in turn to read servo information from its respective disk surface, and means for generating individual head servo signals therefrom; means for generating a composite position error signal from said individual head servo signals; and means for moving said actuator in accordance therewith.

In a disk file with conventional, inductive read/write heads, each head comprises a single coil which is connected to both the read and write multiplexers. As a result, any write signal supplied to a head from the write multiplexer also appears across the read multiplexer. If at the same time another head tried to read a servo signal, then the read multiplexer would receive both this servo signal and the write signal simultaneously. Since write signals are typically 1 V peak-to-peak, compared with a 1 mV peak-to-peak servo signal, the read multiplexer would have to provide isolation of at least 100 dB ($10^5$) in order for the latter not to be seriously distorted by the former. Multiplexers used in modern disk files are not capable of providing such isolation, so that it is not possible to use the servo system disclosed in aforementioned GB 2191877 whilst writing.

A disk file adapted to read data using the MR effect overcomes these problems because there is no longer any direct connection between the read and write elements. Write signals do not appear across the read multiplexer, so that the weak servo signal can be properly isolated from the much stronger write signal. There is still a possibility of the write signal indirectly affecting the servo signal, for example by noise pickup, but any such residual contamination is 2 or 3 orders of magnitude lower than in the above case, and can be prevented by careful design and shielding. As a result, it is possible to multiplex servo signals from different disk surfaces, even when writing data to one of the disks. This provides a much higher servo sampling rate, or a higher storage capacity, or some combination of these two benefits (in line with the trade-off between them described above).

It is preferred that said means for generating a composite position error signal includes means for subtracting from each individual head servo signal the estimated offset of the head that produced that servo signal from the head currently selected for data transfer. It is further preferred that said means for generating a composite position error signal also includes means for storing for each head separately an average value derived from the servo information read by that particular head. The individual head offsets can be obtained using a least squares straight line fit to these average values derived from the servo information, this being particularly suitable when the main source of the offsets is due to spindle tilt. In some circumstances, depending for example on the mechanical characteristics of the file, higher order fits such as quadratics may be more appropriate than simple linear ones, or alternatively the behavior of an individual disk file could form the basis for some offset model stored for example in a look-up table.

There is considerable flexibility in the arrangement of various aspects of a disk file according to the invention. For example the phase offsets between servo patterns on adjacent disk surfaces, which determine the order in which the servo samples are read, do not have to be identical (i.e., a linear increase in phase through the disk stack), but may comprise a more complicated arrangement. One possibility would be such that the servo patterns on the top surfaces of all the disks are read first, and then those on all the bottom surfaces.

DETAILED DESCRIPTION OF THE PREFERRED EMBODIMENT

Figure 1:
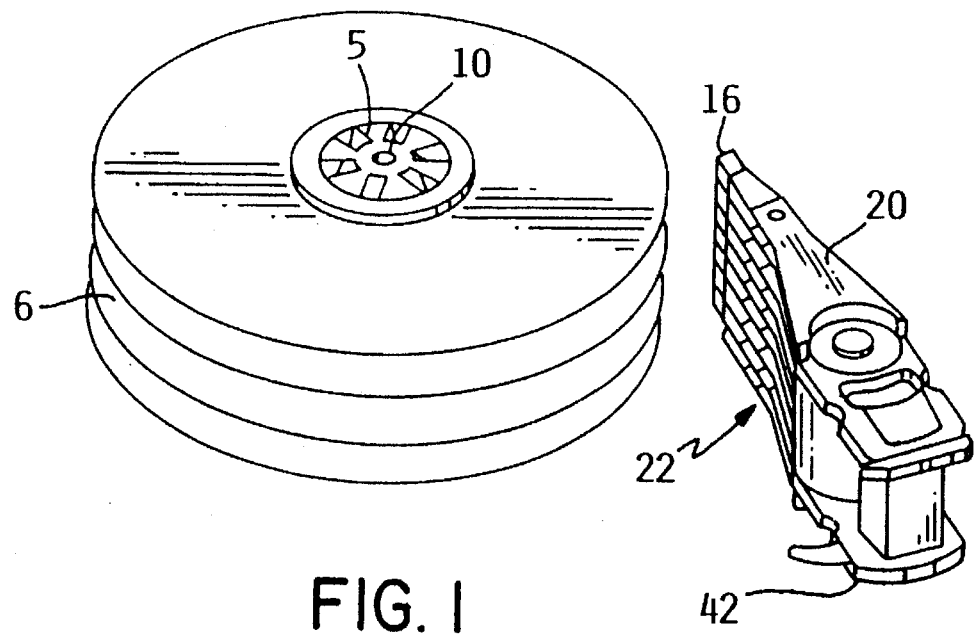
FIG. 1 is a schematic illustration of a disk stack and rotary actuator.

FIG. 1 is a schematic drawing of a disk file rotary actuator and disk stack (prior to their merger). A set of data storage disks 6 are mounted on a hub 5, and are rotatable in unison about spindle 10 by an in-hub motor (not visible). Each disk surface has a respective magnetic transducing head 16 for transferring data to and from the disk surface. The heads are mounted on suspension arms 20, which form part of a rotary actuator 22. The actuator is rotated by a voice coil motor 42 (the magnets of which are not shown) to move the heads in unison radially across the respective disk surfaces. Each head comprises an MR stripe located between the pole tips of an inductive coil, as is known in the art.

Figure 2:
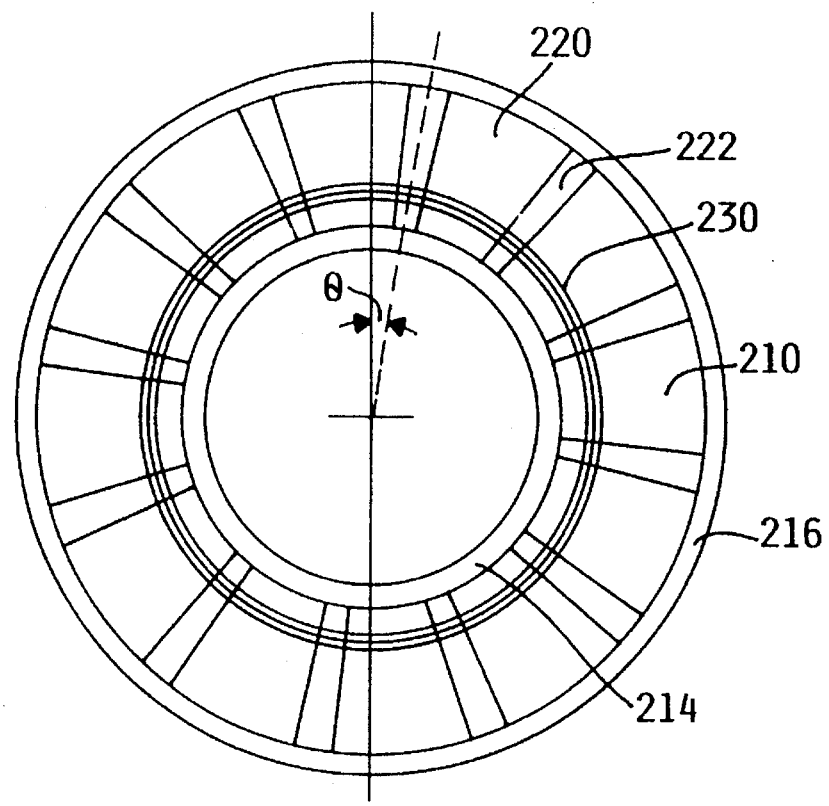
FIG. 2 is a schematic representation of the layout of servo information and data on a disk surface.

FIG. 2 illustrates in simplified form the layout of data and servo information recorded in concentric tracks 230 (only some of which are shown) on a typical disk surface. There is a central data region 210 surrounded by inner and outer guardbands 214, 216, the inner guardband 214 being used as a head landing zone. Data sectors 220 of 512 bytes are interspersed with sectors of servo information 222 of 96 bytes, giving a servo overhead of 19%. With a head data rate of 6 MBytes/s, this would produce a servo sampling rate of just under 10 kHz. The phase of the servo pattern, θ, is indicated, measured with respect to some arbitrary but fixed reference point. As known in the art, the servo information can either be phase or amplitude encoded.

An actual disk file might typically have 8 data storage surfaces and 120 servo sectors per surface (rather than the 12 shown in FIG. 2). With a linear increase in phase from top to bottom of the disk stack, this would imply a phase shift between servo patterns on adjacent data surfaces of $2\pi/960$ radians. The servo information read from each disk surface in turn can be multiplexed together, which for a head data rate of 6 MBytes and data and servo sectors of 512 bytes and 96 bytes respectively (as above), produces a servo sampling rate of nearly 80 kHz. The disk rotation rate is 82 Hz. A more probable arrangement however would be to only retain every fourth servo sample on each disk surface, i.e., to have only 30 servo sectors per data surface and to increase the phase offset between adjacent data surfaces to $2\pi/240$ radians. This would provide a multiplexed servo sampling rate of just under 20 kHz, whilst at the same time reducing the servo overhead to less than 5%. Many other configurations are possible, depending on the disk file in question and the desired balance between servo overhead and sampling frequency.

Figure 3:
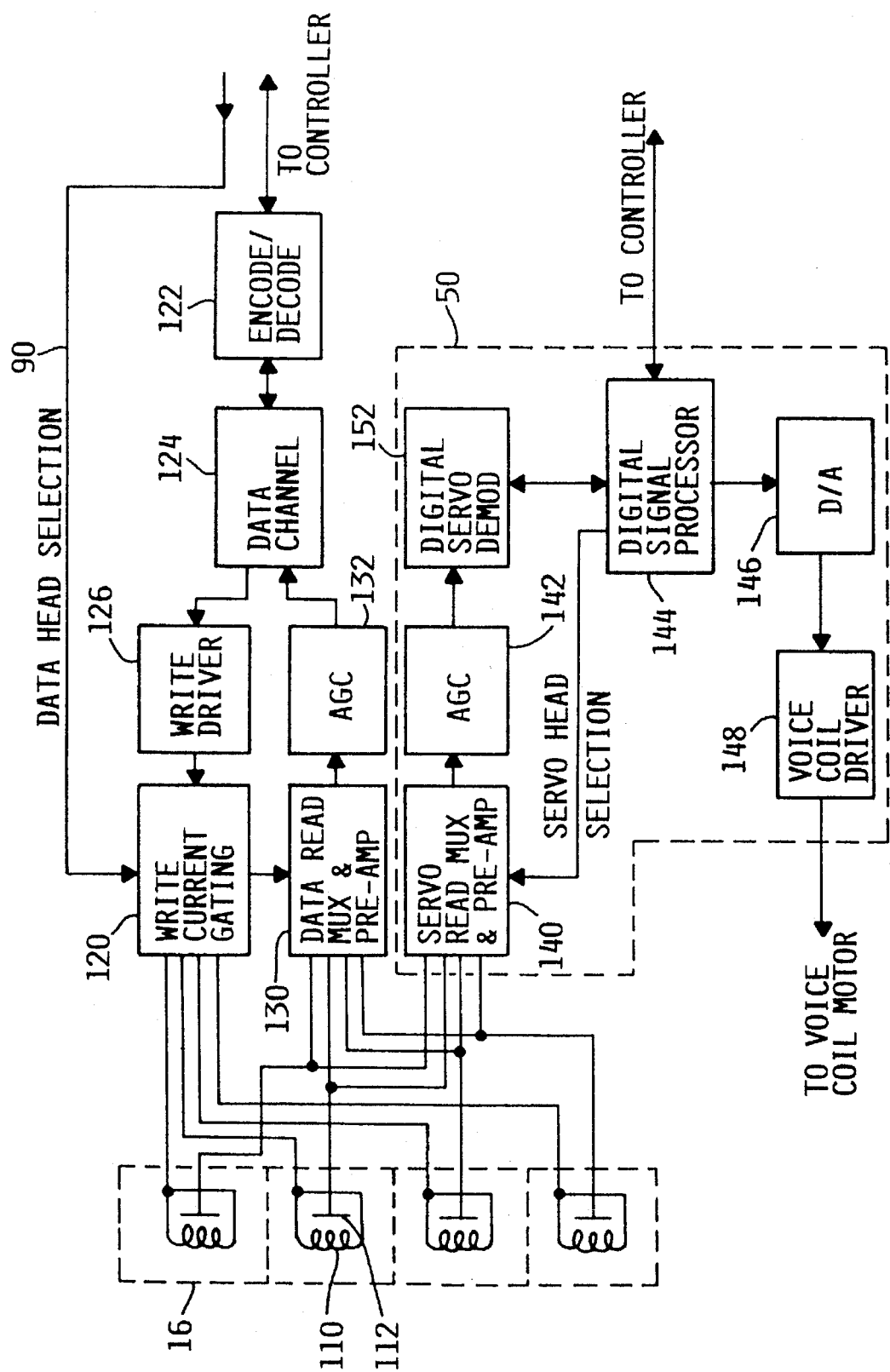
FIG. 3 is a block diagram of the major electrical components in the read/write circuitry of a disk file.

The circuitry typically associated with a disk file according to the invention is shown in FIG. 3. Each head 16 (only four in this embodiment) comprises an inductive write coil 110 and an MR stripe 112. The former, used for writing data to the disks, are all connected to a write multiplexer 120, whilst the latter, used for reading data and servo information from the disks, are connected to both a data multiplexer 130 and a servo multiplexer 140.

When writing, data from the disk controller passes through an encoder 122 and data channel electronics 124 to the write driver 126, whereupon it is fed to the appropriate head by the write current gating or multiplexer circuit 120, in accordance with the data head selection signal 90 from the disk controller. The data read multiplexer 130 selects and receives data from the desired read head according to the data selection signal 90, and returns this data to the disk controller, via an AGC unit 132, the data channel electronics 124, and a decoder 122. The servo system 50 for controlling the head positions includes a digital signal processor (DSP) 144, which receives servo signals from the MR heads via the servo multiplexer 140, an AGC unit 142, and a servo demodulator 152. The DSP calculates a position error signal (PES), which is used to derive a control signal for the voice coil motor (VCM). This control signal passes via a D/A converter 146 and VCM driver 148 to the VCM, which moves the heads accordingly. The DSP also determines the head selection of the servo multiplexer 140.

Figure 4:
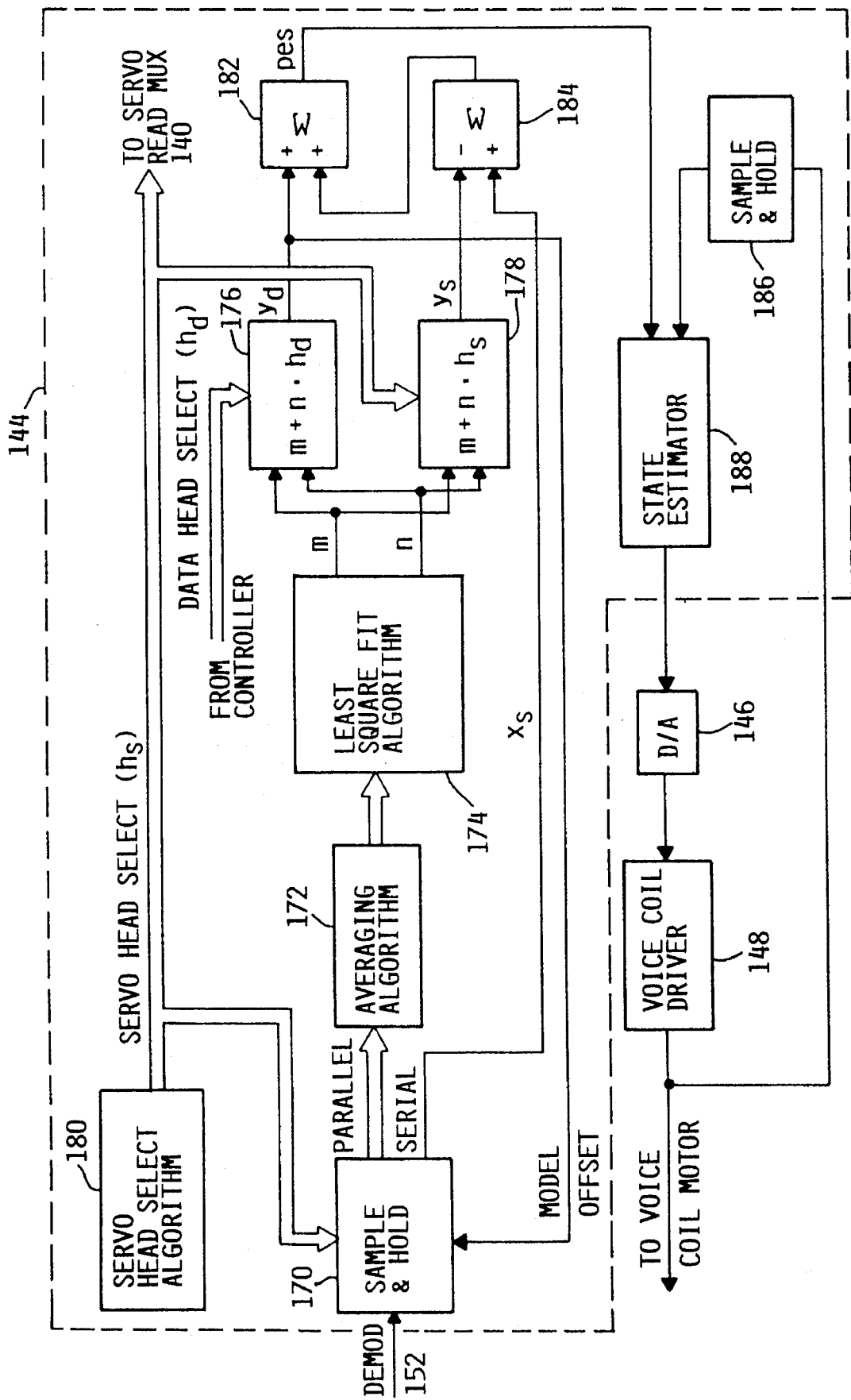
FIG. 4 is a block diagram of the digital signal processor of FIG. 3.

In operation, each head in turn reads a servo information sample from the disk, thereby producing a succession of individual head servo signals which pass from the servo demodulator into a sample and hold unit 170 in the DSP 144 (see FIG. 4). If this series of digital individual head servo values obtained from each disk surface in succession were used directly to form the PES, then any offsets between the heads would result in regular, periodic fluctuations of the PES. Therefore, the individual head servo signals for each head are sent in parallel to an averaging unit 172, which forms separate exponential averages of the signals from each head.

Unit 174 is used to perform a least squares, straight line fit of the form y=m+n.h, where h is the number of the head (the heads are numbered 0, 1, 2 . . . in sequence) and y the average of the individual head servo values for that head (supplied from unit 172). The derived fit parameters m and n are then passed to unit 176, which uses the fit to estimate the offset for the data head ($y_d$), and likewise to unit 178 which estimates the offset for the servo head ($y_s$). The data head is the head currently reading or writing user data, as selected by the disk controller, whilst the servo head is the head currently reading a servo information sample—i.e., as the disk rotates each head in turn (including the data head) becomes the servo head. The servo head select algorithm unit 180, which is driven by the disk rotation clock (not shown), uses the angular position of the disks to determine which head is currently acting as the servo head, and effectively supplies the value of $h_s$ to the sample and hold unit 170, to the servo multiplexer, and to unit 178.

The final PES is generated by units 182 and 184. Unit 184 calculates the quantity $x_s-y_s$, where $x_s$ is the most recently read individual head servo value and $y_s$ is the estimated offset of the relevant servo head (i.e., the head which obtained $x_s$. The value of $y_s$ changes for each new $x_s$ because the change in servo head, which means a different value of $h_s$ used in unit 178. The output of unit 184 is then combined with $y_d$ from unit 176 to produce the final PES (unit 182), which can be written as $x_s-(y_s-y_d)$. In this form it can be seen that the PES is effectively the sequence of individual head values corrected for any offset of the servo head from the data head. The final PES is fed to a state estimator 188 which generates the VCM control signal, using feedback via sample and hold unit 186, as is known in the art.

The embodiment of FIG. 4 includes one further refinement, in that the value of $y_d$ (=model offset) is fed back to the sample and hold unit 170. This stabilizes the least squares fit so that when the data head is changed, the value of m does not automatically change, but is rather held at some arbitrary value. Effectively, it establishes a reference point which all the offsets ($y_s$, $y_d$) are measured from. For example, if m is set at 0, the offset of head 0 is defined as 0, and the other offsets determined accordingly. Note that the model offset should not be subtracted from $x_s$, only from the individual head servo values as passed to the averaging algorithm unit 172. This is because the quantity ($y_s-y_d$) in the PES is in fact already independent of the value of m, as is the measured value $x_s$.

Because the least squares fit in unit 174 is calculated using servo information from all the disks, it can be obtained relatively rapidly. The averages calculated by unit 172 should therefore be reasonably fast (i.e., at least some relatively high frequency information should be retained) in order that this response time is not degraded. The averaging and least squares fit reduce the effect of any random errors present in the individual head servo values (such errors could be due to, amongst other things, wobbles in the servo track, or the relatively poor positional resolution of a narrow MR head).

Initial values of the head averages for unit 172 are generated as part of the start-up procedure following power-on. In this phase, the heads are located over the inner landing zone, which contains only servo information. This means that servo samples are supplied at a much higher frequency than is required for track following, so that the servo demodulator can be switched briefly to a different head and back again without losing track. Performing this process for all the heads allows an initial set of dc offsets to be obtained.

The use of a straight line fit for the head offsets is most appropriate for a disk file where spindle and/or actuator tilt results in a misalignment which is the dominant source of the head offsets. The offset quantity ($y_s-y_d$) need not necessarily be calculated with a straight line fit: for example, in disk files with different mechanical characteristics, other functions, such as quadratics, could be used. Another possibility is to determine a mechanical model of the disk file, and use the model in estimating the offsets. A simpler, but less accurate, method could be based upon using the mean of the head averages as the dc component of the PES (a similar approach to a dedicated servo). Alternatively, if there are significant systematic head-dependent errors that cannot be accurately modelled, such as those due to domain wall changes in the MR stripe, a second averaging unit, calculating a slower average than unit 172, can be included. The appropriate individual head servo averages from this second unit could then be subtracted at unit 184. In other words, $y_s$ and $y_d$ are taken directly from the individual head average servo values, rather than from a least squares fit to them, although if necessary, this approach could in fact be used in combination with the least squares fit of unit 174.

What is claimed is:

1. A disk file comprising:

a plurality of disk data storage surfaces, rotatable in unison, each surface storing data and having a pattern of servo information recorded thereon, said patterns of servo information being offset azimuthally from one disk surface to another;

an actuator supporting a plurality of heads, one head being provided for each respective disk surface, each of said heads including an inductive coil for writing information onto the disk surface, and means adapted to read information therefrom using the magnetoresistive effect;

a head position control system comprising:

(a) head select means for selecting each head in turn to read servo information from its respective disk surface;

(b) means responsive to said head select means for generating individual head servo signals from a selected head;

(c) means for generating a composite position error signal from said individual head servo signals; and (d) means for positioning said actuator in response to said composite position error signal; and means for writing data on one of said plurality of disk data storage surfaces using a head associated with said disk storage surface, while simultaneously with said head position control system reading the pattern of servo information from any other of said plurality of disk data storage surfaces.

2. The disk file of claim 1, wherein said means for generating a composite position error signal includes means for subtracting from each individual head servo signal an estimated offset of the head that produced that servo signal from the head currently selected for data transfer.

3. The disk file of claim 2, wherein said means for generating a composite position error signal includes means for calculating, for each respective head, an average value based on individual head servo signals from said respective head.

4. The disk file of claim 1, wherein said head select means selects which head to read servo information from in response to a signal from a clock controlling the rotation of said disk.

5. The disk file of claim 1, further comprising:

a servo multiplexer connected to said means adapted to read information of each head; and a write multiplexer connected to said inductive coil of each head, wherein no direct electrical connection exists between said servo and write multiplexers.

6. The disk file of claim 5, wherein said means for generating a composite position error signal includes means for subtracting from each individual head servo signal an estimated offset of the head that produced that servo signal from the head currently selected for data transfer.

7. The disk file of claim 6, wherein said means for generating a composite position error signal includes means for calculating, for each respective head, an average value, based on individual head servo signals from said respective head.

8. The disk file of claim 7, further comprising means for;estimating said offset using a least squares straight line fit to said individual head servo signals from each respective head.

9. The disk file of claim 8, wherein an estimated position of the head currently selected for data transfer is subtracted from said individual head servo signals from each respective head before said signals are input to said means for calculating individual head average servo values.

10. The disk file of claim 7, further comprising means for generating said offset by subtracting said individual head average servo value for the head currently selected for data transfer from the individual head average servo value for the head that produced that particular individual head servo signal.

11. A disk file comprising:

a plurality of disk data storage surfaces, rotatable in unison, each surface storing data and having a pattern of servo information recorded thereon, said patterns of servo information being offset azimuthally from one disk surface to another;

an actuator supporting a plurality of disk data storage access means, each of said disk data storage access means being associated with a respective disk data storage surface and being capable of reading data from and writing data to said respective disk data storage surface;

a common servo multiplexer connected to each said storage access means, said servo multiplexer being capable of selecting one of said plurality of storage access means for reading servo information from the disk storage surface associated with said one selected storage access means;

a common write multiplexer connected to each said storage access means, said write multiplexer being capable of selecting one of said plurality of storage access means for writing data to the disk storage surface associated with said one selected storage access means, wherein no direct electrical connection exists between said servo and write multiplexers;

a head position control system comprising:

(a) means responsive to said servo multiplexer for generating individual head servo signals from the selected head;

(b) means, coupled to said means for generating individual head servo signals, for generating a composite position error signal from said individual head servo signals; and (c) means for positioning said actuator in response to said composite position error signal; and means for writing data on one of said plurality of disk data storage surfaces using a storage access means associated with said disk storage surface, simultaneously with said head position control system reading the pattern of servo information from any other of said plurality of disk data storage surfaces.

12. The disk file of claim 11, wherein said means for generating a composite position error signal includes means for subtracting from each individual head servo signal an estimated offset of the head that produced that servo signal from the head currently selected for data transfer.

13. The disk file of claim 12, wherein said means for generating a composite position error signal includes means for calculating, for each respective head, an average value based on individual head servo signals from said respective head.

14. The disk file of claim 13, further comprising means for estimating said offset using a least squares straight line fit to said individual head servo signals from each respective head.

\* \* \* \* \*